US012695101B2

(12) United States Patent
Bakker

(10) Patent No.: US 12,695,101 B2
(45) Date of Patent: *Jul. 28, 2026

(54) LIQUID-ACTIVATABLE BATTERY

(71) Applicant: Battery Research Technology Limited, Wan Chai (HK)

(72) Inventor: Niels Bakker, Central (HK)

(73) Assignee: Phenogy AG, Root (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,462

(22) Filed: Nov. 3, 2021

(65) Prior Publication Data

US 2022/0059852 A1    Feb. 24, 2022

Related U.S. Application Data

(63) Continuation of application No. 16/075,589, filed as application No. PCT/IB2017/000048 on Jan. 30, 2017, now abandoned.

(30) Foreign Application Priority Data

Feb. 5, 2016    (CN) .................................. 16101446.0

(51) Int. Cl.
| | |
|---|---|
| *H01M 6/34* | (2006.01) |
| *H01M 6/32* | (2006.01) |

(Continued)

(52) U.S. Cl.
CPC ............... *H01M 6/34* (2013.01); *H01M 6/32* (2013.01); *H01M 10/36* (2013.01);
(Continued)

(58) Field of Classification Search
CPC ........ H01M 6/32; H01M 6/34; H01M 6/5022; H01M 6/085; H01M 50/186; H01M 50/213
See application file for complete search history.

(56) References Cited

U.S. PATENT DOCUMENTS

| | | | | | |
|---|---|---|---|---|---|
| 4,684,588 | A | * | 8/1987 | Goebel ................... | H01M 6/38 |
| | | | | | 429/94 |
| 5,400,211 | A | * | 3/1995 | Evans ................. | H01M 50/133 |
| | | | | | 361/275.1 |

(Continued)

FOREIGN PATENT DOCUMENTS

| | | | |
|---|---|---|---|
| CN | 202333045 U | | 7/2012 |
| CN | 203674306 U | * | 6/2014 |

(Continued)

OTHER PUBLICATIONS

Dynisco. "Understanding Plastics and Polymers—The Different Types of Plastic". AZOM. <https://www.azom.com/article.aspx?ArticleID=17477>. (Year: 2019).*

(Continued)

*Primary Examiner* — Helen Oi K Conley
*Assistant Examiner* — Amanda Rosenbaum
(74) *Attorney, Agent, or Firm* — Kolisch Hartwell, P.C.

(57) ABSTRACT

A battery includes a casing that has an inner surface defining a chamber for an electrolyte, and a conductive lining being configured for electrical communication with a first battery terminal. There is also a permeable separator sheet disposed between the electrolyte and the conductive surface; a conductive rod having a first end configured for electrical communication with a second battery terminal, and, a second end configured for contacting the electrolyte. There is also an opening disposed in the casing; a sealing member configured for arrangement between at least a sealed position and an unsealed position to allow a potential difference to be produced between the first and second battery terminals. There is also at least one spacing element configured for spacing the electrolyte apart from the conductive lining within the chamber.

17 Claims, 11 Drawing Sheets

(51) Int. Cl.

| | | |
|---|---|---|
| *H01M 10/36* | (2010.01) |
| *H01M 50/121* | (2021.01) |
| *H01M 50/124* | (2021.01) |
| *H01M 50/186* | (2021.01) |
| *H01M 50/213* | (2021.01) |

(52) U.S. Cl.
CPC ..... *H01M 50/121* (2021.01); *H01M 50/1243* (2021.01); *H01M 50/186* (2021.01); *H01M 50/213* (2021.01)

(56) References Cited

U.S. PATENT DOCUMENTS

| | | | | |
|---|---|---|---|---|
| 10,141,580 B2 * | 11/2018 | Bakker | ............... | H01M 50/463 |
| 2012/0148882 A1 * | 6/2012 | Bakker | .................. | H01M 6/32 |
| | | | | 429/118 |
| 2017/0092961 A1 * | 3/2017 | Liaw | .................. | H01M 50/394 |

FOREIGN PATENT DOCUMENTS

| | | | | | |
|---|---|---|---|---|---|
| CN | 104979510 A | 10/2015 | | |
| JP | 2007146317 A | 6/2007 | | |
| TW | M462753 U | 10/2013 | | |
| WO | WO-2014090163 A1 * | 6/2014 | .............. | H01M 2/36 |
| WO | 2016004843 A1 | 1/2016 | | |

OTHER PUBLICATIONS

CN 203674306 U translation (Year: 2013).*

European Patent Office, "Supplementary European Search Report" in connection with related European Patent App. No. 17747060, filed Aug. 9, 2019, 7 pgs.

Li, Faxi, Authorized Officer, State Intellectual Property Office of the P.R. China, "International Search Report" in connection with related International Application No. PCT/IB2017/000048, dated May 2, 2017, 2 pgs.

Polypropylene Full Stretch Filament Device, Nov. 30, 1998, 2 pgs.

* cited by examiner

LIQUID-ACTIVATABLE BATTERY

CROSS-REFERENCE TO RELATED APPLICATIONS

This application is a continuation of U.S. patent application Ser. No. 16/075,589, filed Aug. 3, 2018 and entitled BATTERY, which is incorporated herein by reference in its entirety for all purposes.

TECHNICAL FIELD

The present invention relates to the field of reusable batteries and particularly batteries which are activated by addition of a liquid such as water.

BACKGROUND OF THE INVENTION

Conventional off-the-shelf type AA and AAA batteries tend to deteriorate in performance over time during storage. This poses a serious problem where the reliability in performance of the batteries is of critical importance—for instance, in an emergency situation where the batteries are required to power a flashlight, a radio, a mobile telephone, or other potentially life-saving electronic device.

In seeking to address this problem, water-activatable batteries have been developed which can be stored for a relatively long period of time in an inactive state (that is, where water has not yet been mixed with the electrolyte powder mixture within the battery to activate the electrolyte powder mixture) without substantial loss in performance of the battery when the battery is subsequently activated by addition of water.

However, it is perceived that certain existing water-activated batteries exhibit deficiencies in terms of their electrolyte storage capacity, efficiency of mixing of water with electrolyte inside the battery chamber, and ability to maintain electrical communication between components within the battery over time, all of which may ultimately compromise the performance of such batteries.

SUMMARY OF THE INVENTION

The present invention seeks to alleviate at least one problem discussed above.

The present invention may involve several broad forms. Embodiments of the present invention may include one or any combination of the different broad forms herein described.

In a first broad form the present invention provides a battery including: a casing having an inner surface defining a chamber in which an electrolyte is disposed therein; a conductive lining disposed within the chamber adjacent the inner surface of the casing, the conductive lining being configured for electrical communication with a first battery terminal; a permeable separator sheet disposed between the electrolyte and the conductive surface; a conductive rod having a first end configured for electrical communication with a second battery terminal, and, a second end configured for contacting with the electrolyte; an opening disposed in the casing; a sealing member configured for arrangement between at least a sealed position which restricts ingress of a liquid into the chamber via the opening, and, an unsealed position which allows ingress of a liquid into the chamber via the opening and into contact with the electrolyte so as to allow a potential difference to be produced between the first and second battery terminals; and at least one spacing element configured for spacing the electrolyte apart from the conductive lining within the chamber whereby the liquid is able to pass between the electrolyte and the conductive surface.

Preferably, the present invention may include a biasing means for urging the conductive lining and the first battery terminal into electrical communication with each other.

Preferably, the biasing means may include a silicone pad.

Preferably, the casing may include an electrically-insulative material.

Preferably, the electrically insulative material may include a polymeric material.

Typically, the polymeric material may include at least one of a monopolymer, a copolymer, a mixed polymer blend, a thermoplastic material, a thermoset material, PE, PP, PVC, PVA, EVA, PEEL, PMMA, PTFE and any combination thereof.

Preferably, the casing may be extrusion moulded or injection moulded.

Preferably, the electrolyte may include compressed electrolyte powder.

Preferably, the conductive surface may include a zinc material.

In a further broad form, the present invention provides a battery including: a casing having an inner surface defining a chamber in which an electrolyte is disposed therein; a conductive surface disposed within the chamber adjacent the inner surface of the casing, the conductive surface being configured for electrical communication with a first battery terminal; a permeable separator sheet disposed between the electrolyte and the conductive surface; a conductive rod having a first end configured for electrical communication with a second battery terminal, and, a second end configured for contact with the electrolyte; an opening disposed in the casing; a sealing member configured for arrangement between at least a sealed position which restricts ingress of a liquid into the chamber via the opening, and, an unsealed position which allows ingress of a liquid into the chamber via the opening and into contact with the electrolyte so as to cause a potential difference to be produced between the first and second battery terminals; and a biasing member configured for urging the conductive surface and the first battery terminal into electrical communication with each other.

Preferably the biasing member may include a silicone pad.

Preferably at least one spacing element may be configured for spacing the electrolyte apart from the conductive lining within the chamber whereby the liquid is able to pass between the electrolyte and the conductive surface.

Preferably, the casing may include an electrically-insulative material.

Preferably, the electrically insulative material may include a polymeric material.

Preferably, the polymeric material may include at least one of a monopolymer, a copolymer, a mixed polymer blend, a thermoplastic material, a thermoset material, PE, PP, PVC, PVA, EVA, PEEL, PMMA, PTFE and any combination thereof.

Preferably, the casing may be extrusion moulded or injection moulded.

Preferably, the electrolyte may include compressed electrolyte powder.

Preferably the conductive surface may include a zinc material.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF PREFERRED EMBODIMENTS

Preferred embodiments of the present invention will now be described with reference to the accompanying FIGS. 1 to 19. The exemplary embodiments described herein include a battery that is activatable upon ingress of a liquid into the battery casing via an opening at a first end of the casing that may be selectably sealed and unsealed. When water enters the chamber it contacts with an electrolyte within the chamber so as to activate the electrolyte for operation of the battery. Embodiments of the present invention may comply with standard shape and dimensions of AA and AAA batteries may provide performance output which may be substantially comparable to AA and AAA type batteries.

In the description, reference to the term polymeric material may include any polymer, monopolymer, copolymer, mixed polymer blend, such as a thermoplastic material, a thermoset material, PE, PP, PVC, PVA, EVA, PEEL, PMMA or PTFE by way of example.

Figure 1:
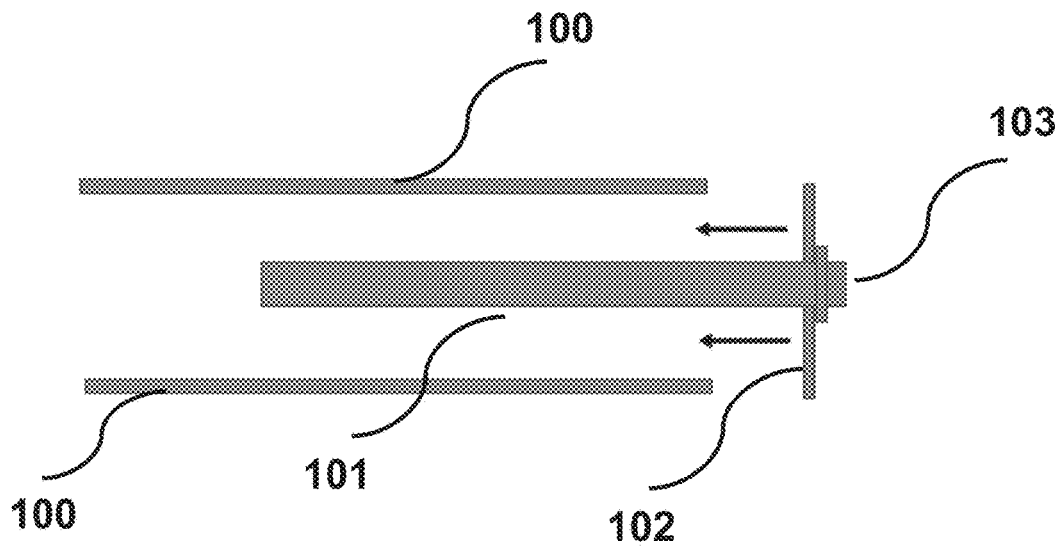
FIG. 1 depicts a side cut-away view of a first step in the production of batteries having a co-moulded carbon rod and a first end cap co-moulded together and being maneuvered into position relative to the battery casing in accordance with an embodiment of the present invention.
Figure 19:
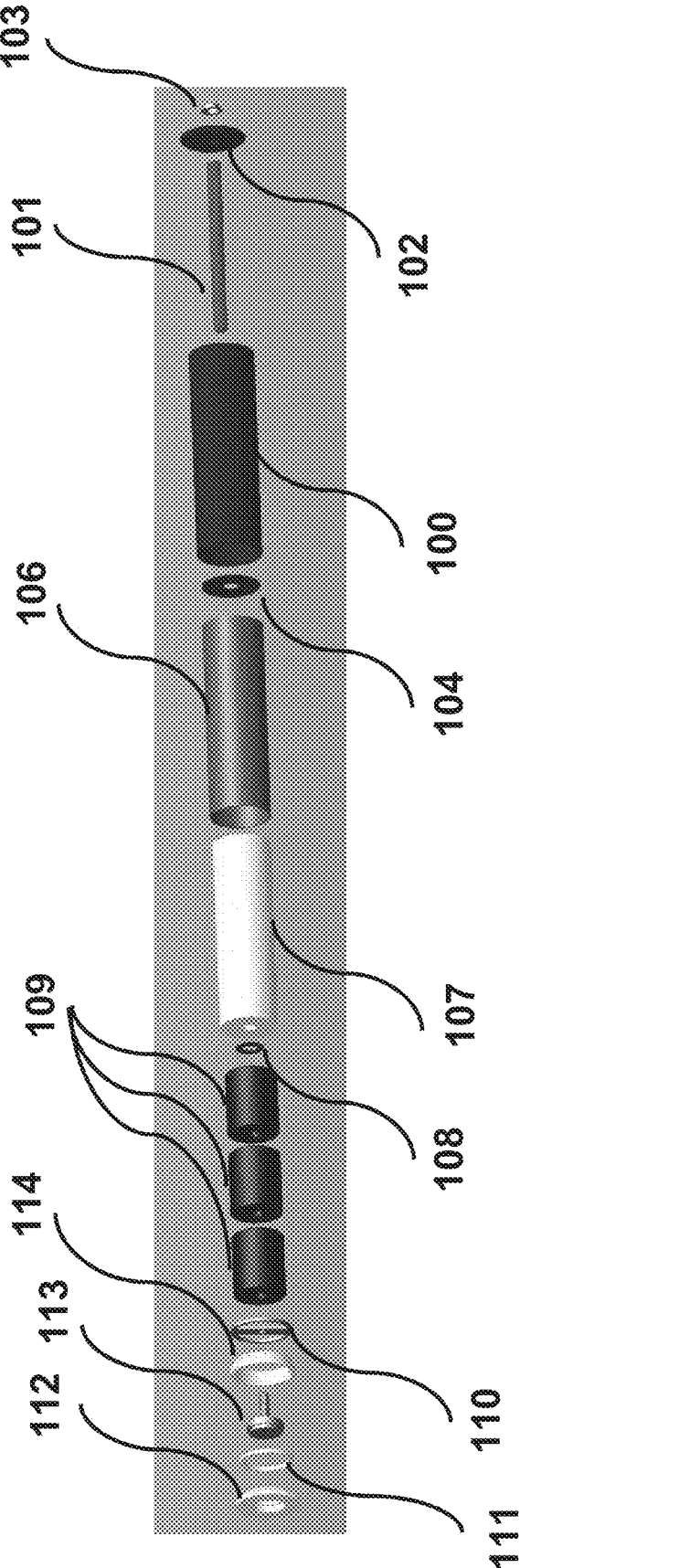
FIG. 19 shows an exploded perspective view of the parts of a battery in accordance with an embodiment of the present invention.

FIG. 19 shows an exploded view of the key features of a first embodiment battery whilst FIGS. 1 to 17 show various stages in the formation of such a battery according to one embodiment. Referring firstly to FIG. 1, a first step in the formation of a battery is shown whereby a battery casing (100) is initially provided with opened first and second ends. The casing (100) is formed from an electrically-insulative material which is preferably a polymeric material. The casing (100) may preferably be formed by way of extrusion moulding or injection moulding techniques. Conveniently, extruded polymeric tubing is able to be formed relatively quickly and cost-effectively, and may be cut to size and dimensions suitable for use as the battery casing of AA and AAA standard size batteries.

A first end portion of the battery is provided comprising of a first end cap (102) with an aperture disposed in its center. A first end of a carbon rod (101) extends partially through the aperture in the first end cap (102) and a nickel-plated brass terminal (103) is attached to the first end of the carbon rod (101). The carbon rod (101) and the nickel-plated brass terminal (103) are co-moulded together with the first end cap (102) which in this embodiment includes any electrically-insulative polymeric material.

The first end cap (102) is shaped and dimensioned to complement the opening at the first end of the casing (100). During assembly of the battery, the first end cap (102) is moved into contact with the casing (100) such that the peripheral edge of the first end cap (102) neatly covers the opening of the casing (100). The first end cap (102) is then bonded to the casing (100) using any suitable bonding means which may include for instance, adhesive bonding or ultrasonic bonding. When bonded together, the first end cap (102) forms a water-tight seal around the opening at the first end of the casing (100) and the carbon rod is disposed inwardly of the casing (100) substantially along a length of the casing (100).

5

Figure 2:
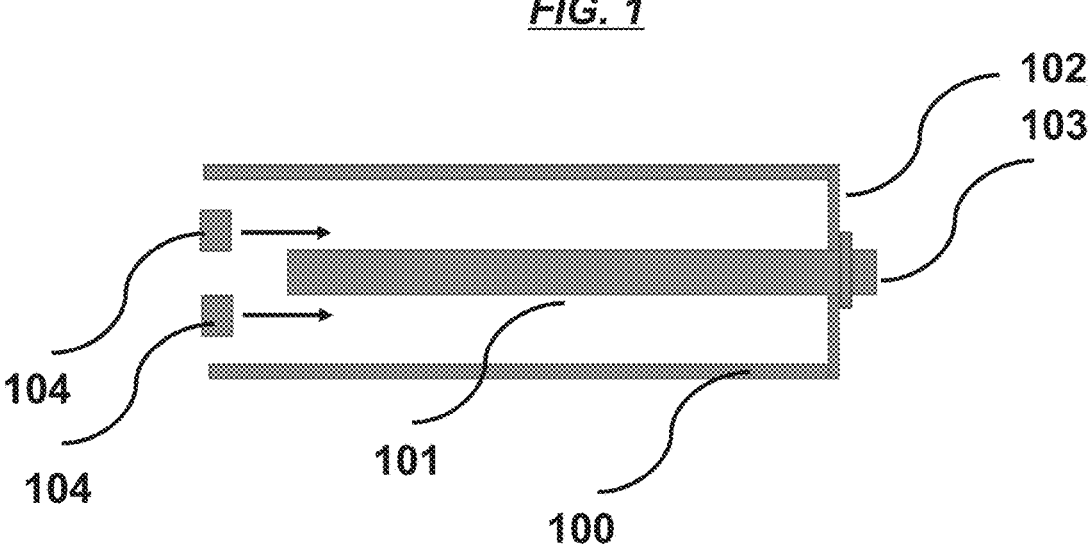
FIG. 2 depicts a side-cut away view of a second step in the production of batteries in which a biasing element is shown being positioned in the casing in accordance with an embodiment of the present invention.

Referring now to FIG. 2, a biasing member (104) is positioned inside of the casing (100), the purpose of which will be described further below. The biasing member (104) in this embodiment includes a circular-shaped silicone pad having an aperture disposed in its centre that is suitably shaped to allow it to be slid over the carbon rod (101) via an opening in a second end of the casing (100). The silicone pad is slid inwardly of the casing (100) along the carbon rod (101) until it abuts against an inward facing surface of the first end cap (102) of the first end portion. In alternative embodiments, the biasing member (104) may take the form of a coil spring or leaf spring configuration for instance.

Figure 3:
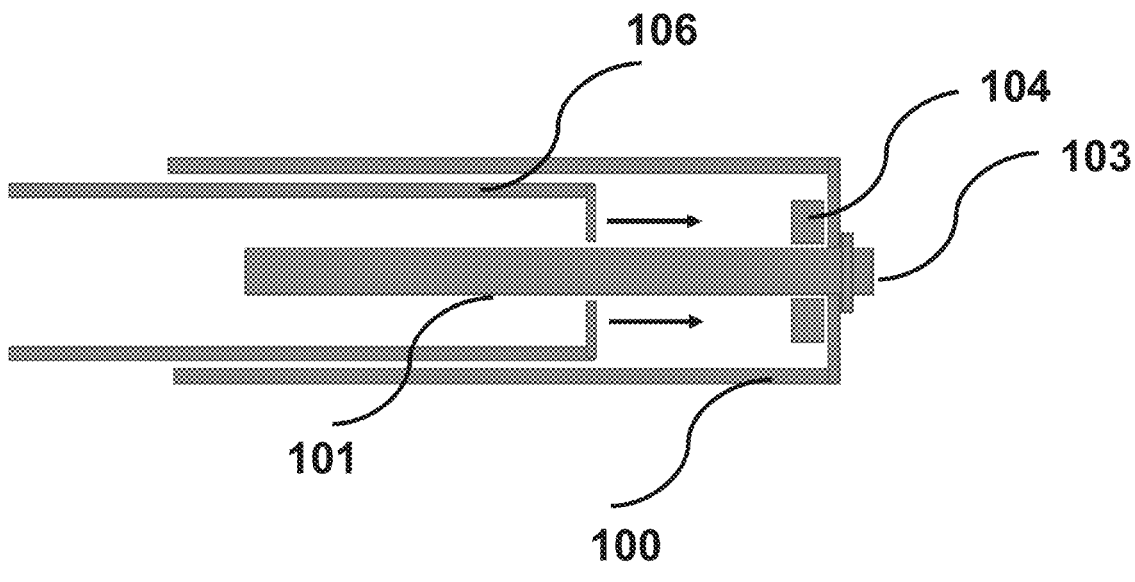
FIG. 3 depicts a side-cut away view of a third step in the production of batteries whereby a zinc tube is inserted into the casing in accordance with an embodiment of the present invention.
Figure 4:
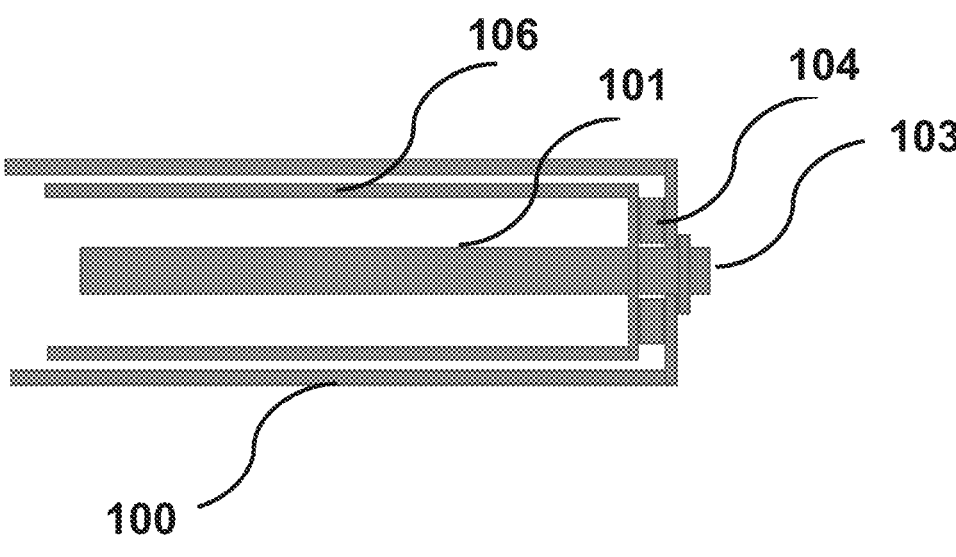
FIG. 4 shows a side cut-away view of a zinc lining resting against the biasing member after being inserted in to the casing.

As shown in FIG. 3, a conductive lining (106) is inserted into the casing (100) via the opening in the second end of the casing (100). In this embodiment, the conductive lining (106) includes a zinc material however other conductive materials may be used in alternate embodiments. The zinc lining (106) in this embodiment includes a cylindrical section having a first end with an opening of relatively smaller diameter that is sized and dimensioned to allow the carbon rod (101) to be snugly inserted therethrough and a second end with an opening of relatively larger diameter. The zinc lining (106) is slid into the casing (100) as shown in FIG. 3 until a surface of the zinc lining at the first end of the zinc lining (100) abuts against the silicone pad (104) as shown in FIG. 4. The presence of the silicone pad (104) between the zinc lining (106) assists in biases the zinc lining in a direction towards the securement member (110) and battery terminal (113) so as to assist in maintaining electrical communication with the securement member (110) and battery terminal (113).

Figure 5:
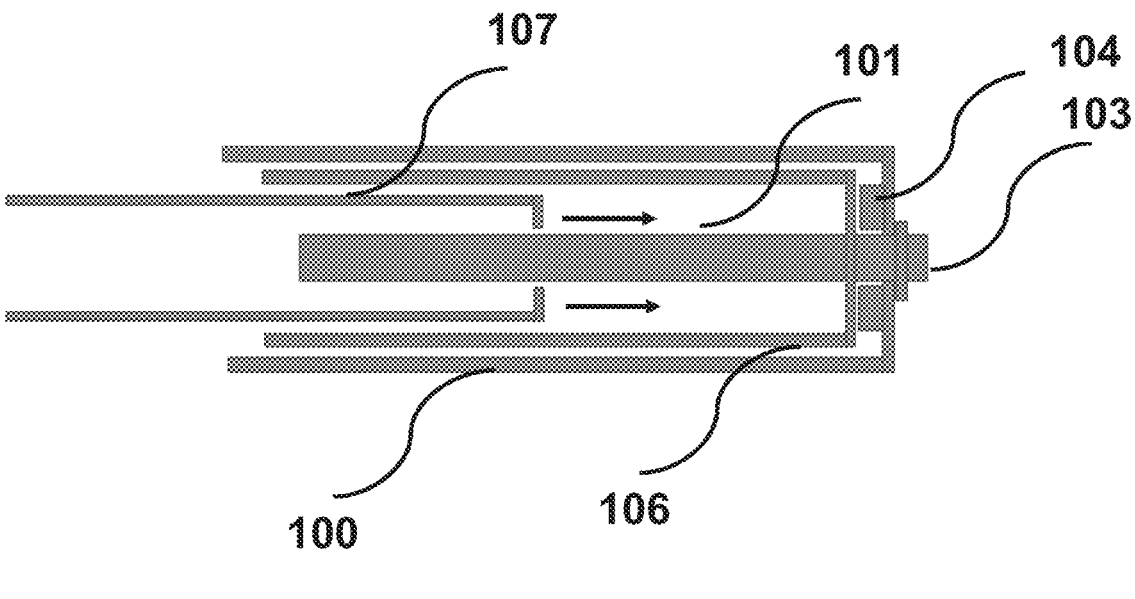
FIG. 5 shows a side cut-away view of a permeable separator sheet being inserted into the battery casing zinc lining resting against the biasing member after being inserted in to the casing.
Figure 6:
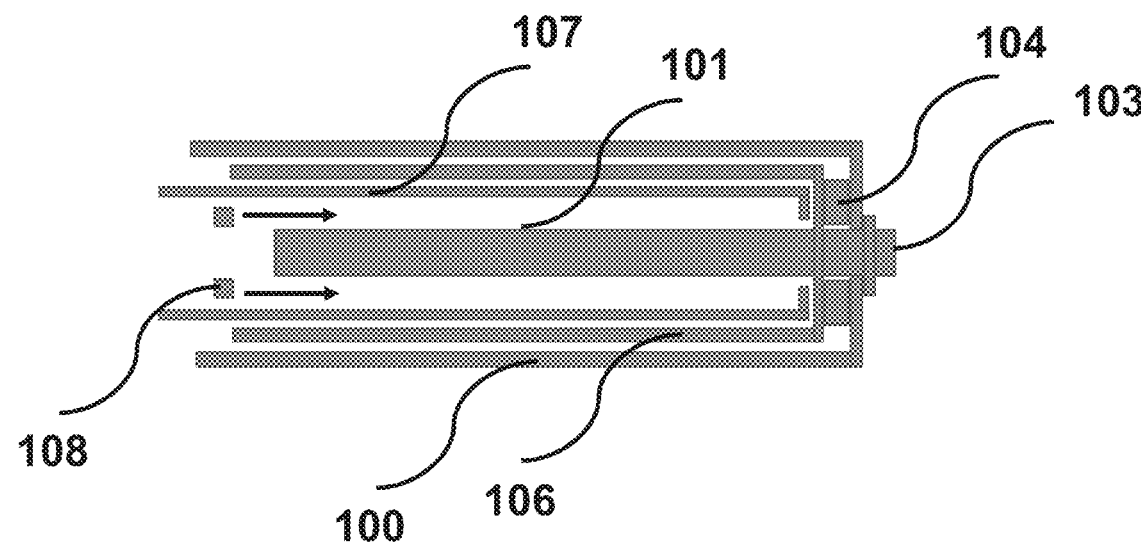
FIG. 6 shows a side cut-away view of a spacer element being inserted in to a nested position within the electrolyte paper.
Figures 7, 8:
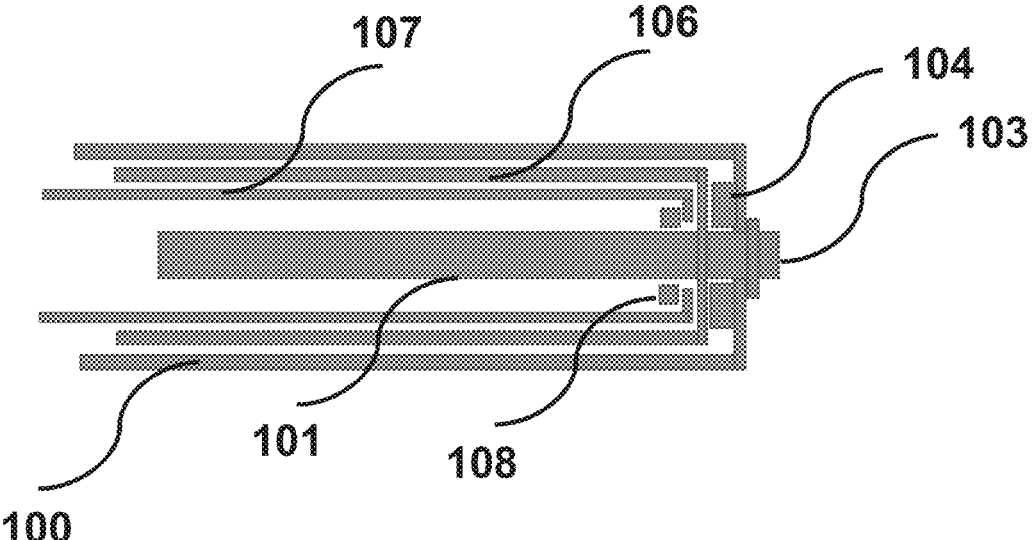
FIG. 7 shows a side cut-away view of a further step in production of a battery in accordance with an embodiment of the present invention.
FIG. 8 shows a side cut-away view of electrolyte powder rings being inserted in to nested configuration within the permeable separator sheet in accordance with an embodiment of the present invention.
Figure 9:
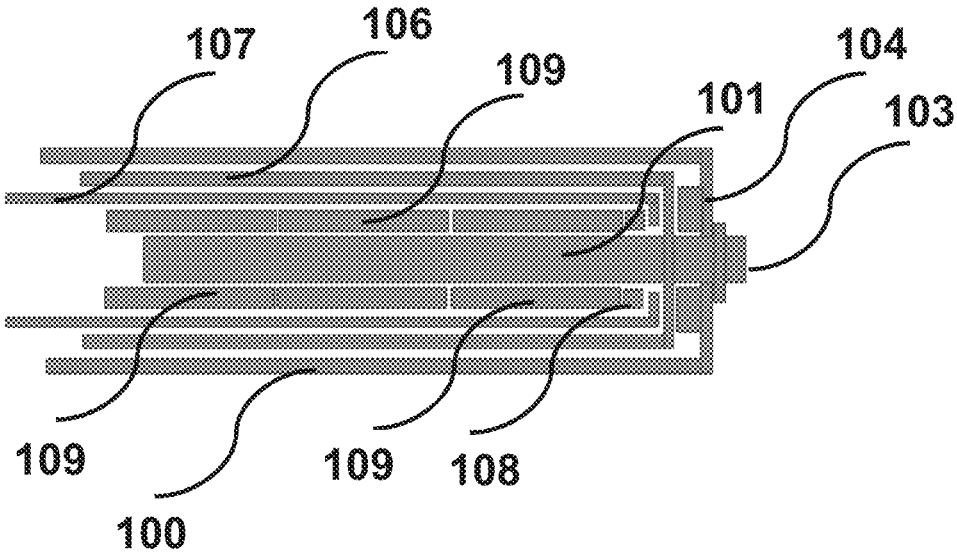
FIG. 9 shows a side cut-away view of all electrolyte power rings safely positioned within the casing before the permeable separator sheet not yet folded over to retain the electrolyte therein, in accordance with an embodiment of the present invention.

The battery also includes a permeable separator sheet (107) which is configured to be nested within the conductive lining (106). In this embodiment, the permeable separator sheet (107 is of similar shape configuration to that of the conductive lining (106) and also includes a first end with an opening of relatively smaller diameter that is sized and dimensioned to allow the carbon rod (100) to be snugly inserted therethrough and a second end with an opening of relatively larger diameter. The permeable separator sheet (107) is slid into the casing (100) as shown in FIG. 5 until a surface of the permeable separator sheet (107) at the first end of the permeable separator sheet (107) abuts against the inner wall of the conductive lining (106) as shown in FIG. 6. Once the permeable separator sheet is in place, a spacer element (108) is positioned in the casing (100) so as to be surrounded by the permeable separator sheet (107) as shown in FIG. 6. The spacer element (108) in this embodiment is a disk-shaped element having an aperture disposed centrally of it which is sized and dimensioned for the carbon rod (101) to fit snugly therethrough. The spacer element (108) is slid along the carbon rod (101) until it abuts against the inward facing surface of the permeable separator sheet (107) as shown in FIG. 7. In this embodiment the spacer element (108) is comprised of a silicone material although it need not necessarily be silicone and may be comprised of a non-polymeric material as long as it is suitable for spacing apart the electrolyte powder rings from the surface of the zinc lining as depicted in the drawings.

The battery includes three compressed electrolyte powder rings (109) which are slid into the casing (100) so as to be surrounded by the permeable separator sheet (107). The diameters of the compressed electrolyte power rings (109) are formed so as to allow for a suitable gap between the peripheral edges of the powder rings (109) and the permeable separator sheet (107) whereby when the compressed electrolyte powder rings (109) are exposed to water, the

Figure 17:
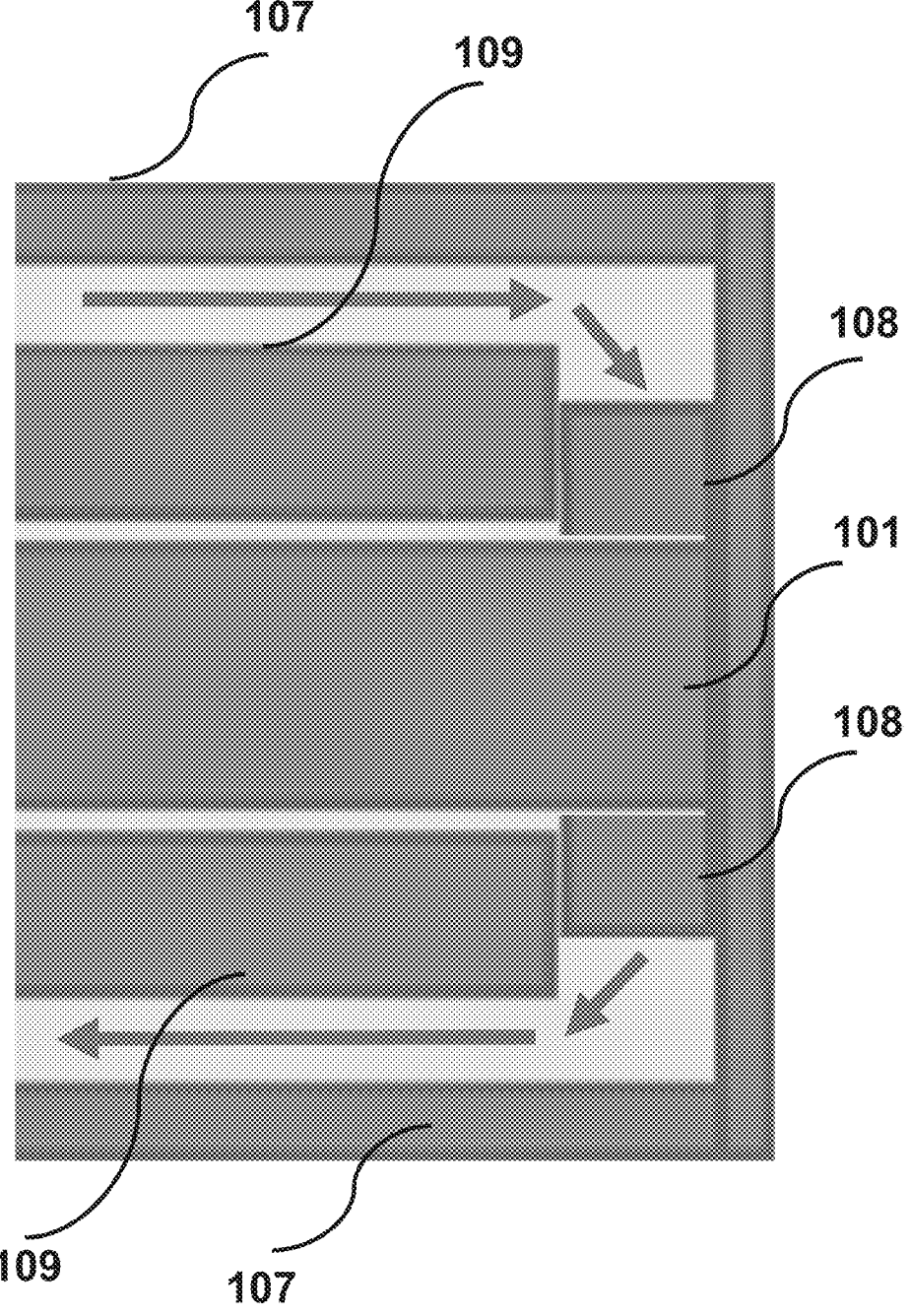
FIG. 17 illustrates how water is vented within the battery casing by virtue of the spacer element in accordance with an embodiment.
Figure 18:
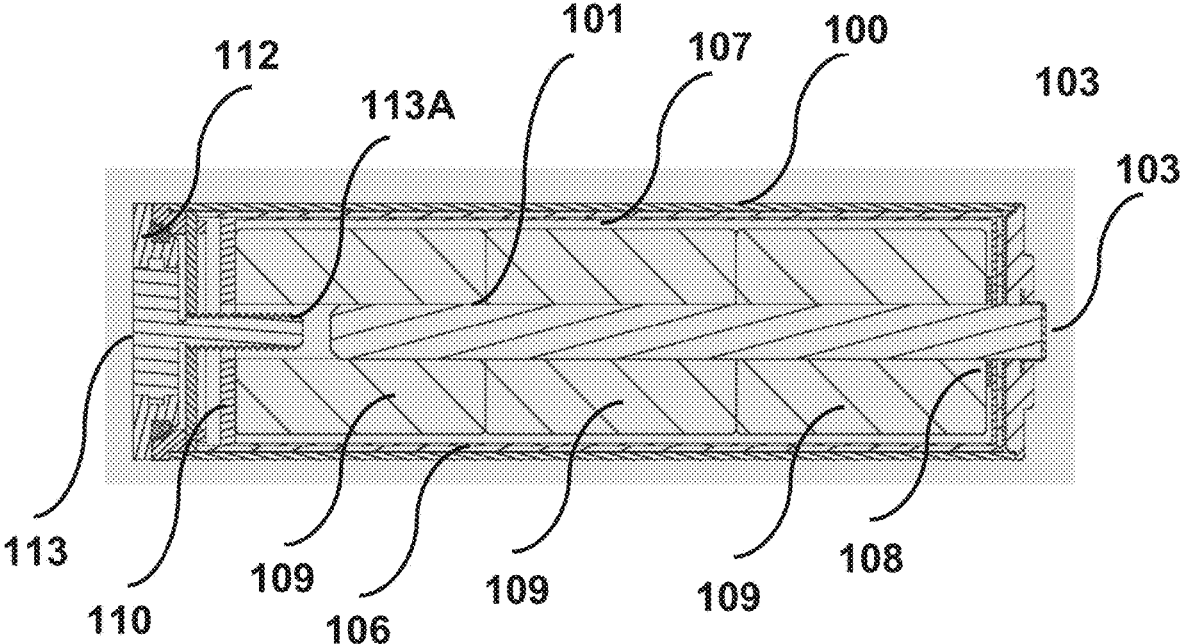
FIG. 18 illustrates a further exemplary depiction of a battery embodiment of the present invention.

6 expansion of the powder rings (109) may be conveniently accommodated by inclusion of the gap. Also the silicone spacer element (108) disposed between the first compressed electrolyte power ring and the permeable separator sheet (107) assist in allowing the venting of water which may circulate more freely within the casing (100) and thereby assist in enhancing battery performance. FIG. 17 shows a magnified cut-away view of the spacer element (108) nested within the conductive zinc lining (106) whereby it spaces the compressed electrolyte powder rings from the zinc lining and water is able to be vented within the casing along a flow path as represented by the direction of the arrows.

The electrolyte comprising the compressed powder rings (107) may be formed from a metal oxide powder such as manganese dioxide, iron oxide or crystalline silver oxide. In this embodiment, the electrolyte includes approximately 3% ammonium chloride particles, 16% zinc chloride particles, 68% manganese dioxide particles, 12.4% acetylene carbon black particles and 0.6% zinc oxide particles by percentage weight of the electrolyte. Before being compressed into powder rings, the electrolyte particles are ball-milled using a rotary or planetary ball mill and ceramic balls such as agate (carnelian). During testing, a laboratory ball-milling machine of 500 ml volume was used with ceramic milling balls weighing 110 g and having diameters of 22.4 mm, or, small sized balls weighing 190 g weight and having diameters of 10.0 mm. Also during testing, 150 g of electrolyte was milled on each occasion. It would be understood that the ball milling of the electrolyte can be suitably scaled up to industrial size to accommodate much larger production. Electrolyte particles resulting from the ball-milling have substantially spherical-shaped configurations with diameters approximately in the range of around 0.2-0.8 mm, densities in the range of approximately 1.71-1.75 g/cm3, and water content of approximately 3% or less. Embodiments of the present invention are assembled in a humidity controlled environment, commonly referred to as a "dry room" to alleviate risk of moisture inadvertently activating the electrolyte.

Figure 10:
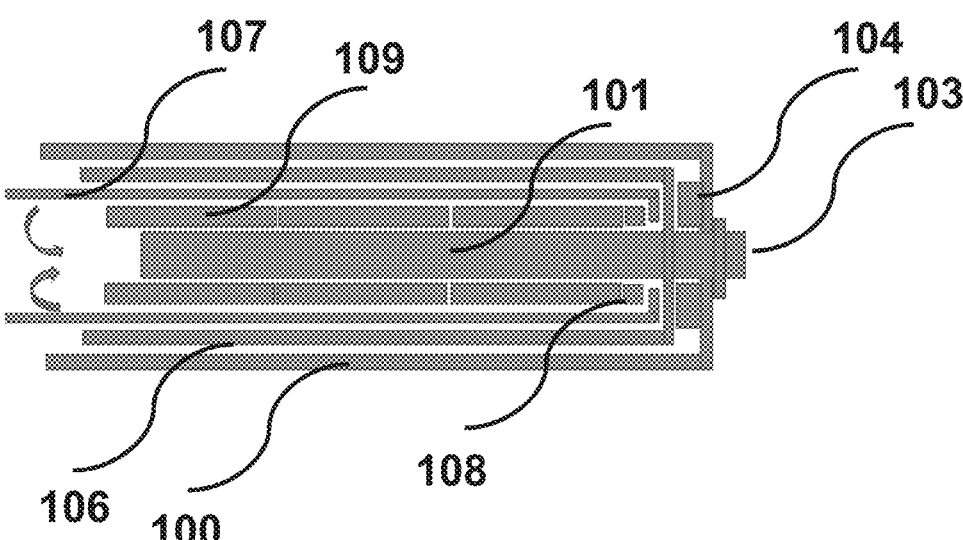
FIG. 10 shows a side cut-away view of all electrolyte power rings safely positioned within the casing just as the permeable separator sheet is beginning to be folded over to retain the electrolyte therein in accordance with an embodiment.
Figure 11:
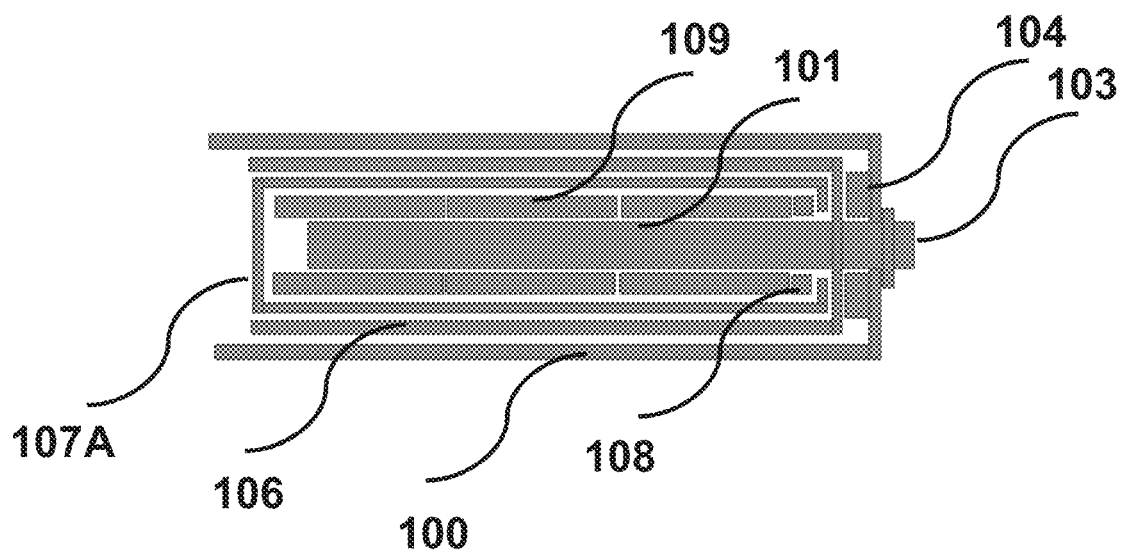
FIG. 11 shows a side cut-away view of a battery with the permeable separator sheet folded over the electrolyte power rings to retain the electrolyte therein, in accordance with an embodiment.
Figure 12:
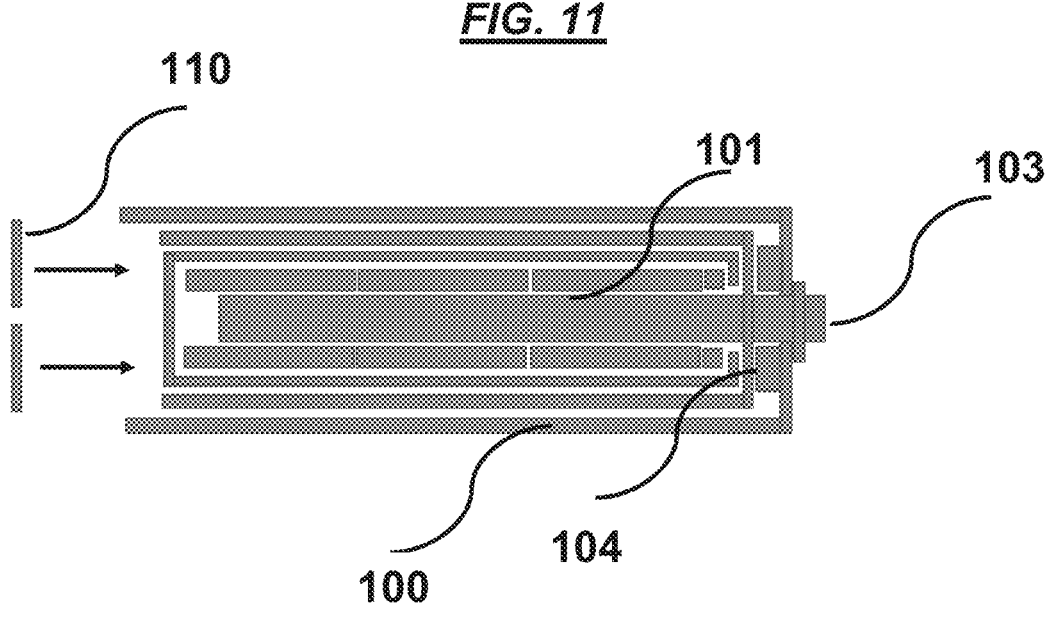
FIG. 12 shows a side cut-away view of a securement member in the process of being moved in to the battery casing so as to hold the separator sheet folded over in accordance with one embodiment of the present invention.
Figure 13:
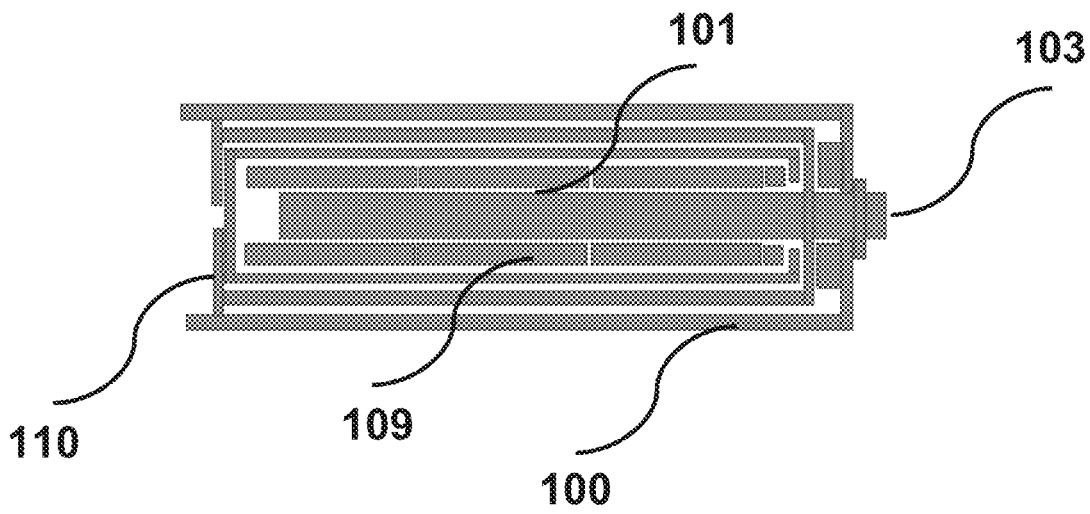
FIG. 13 shows a side cut-away view of a securement member firmly in place within the battery casing in accordance with an embodiment of the present invention.
Figure 14:
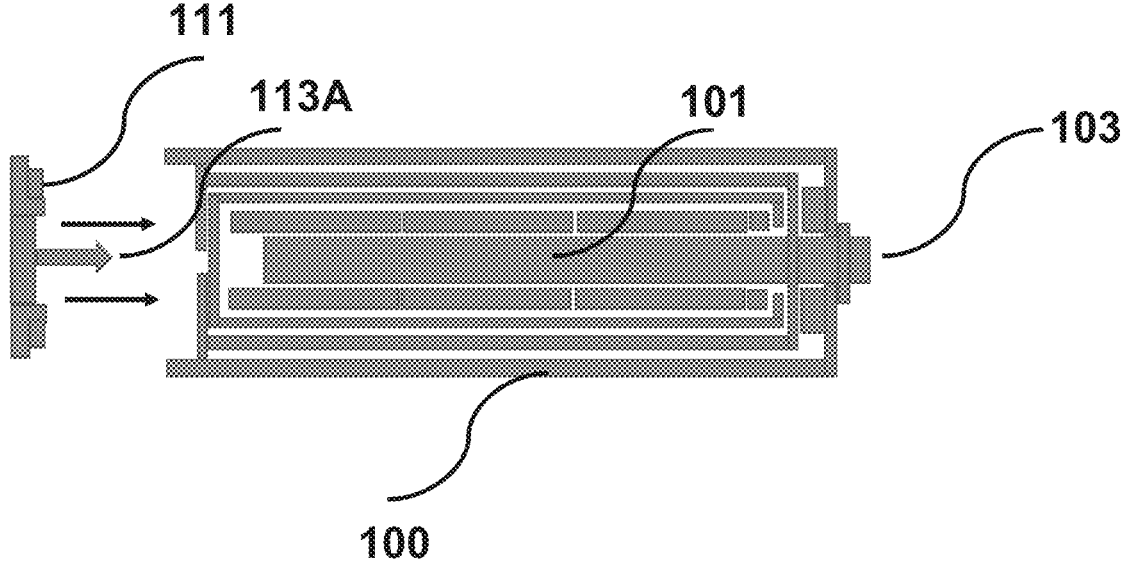
FIG. 14 shows a side cut-away view of all electrolyte power rings safely positioned within the casing, the permeable separator folded over to retain the electrolyte therein, and a second end cap being positioned for attachment to the battery casing.
Figure 15:
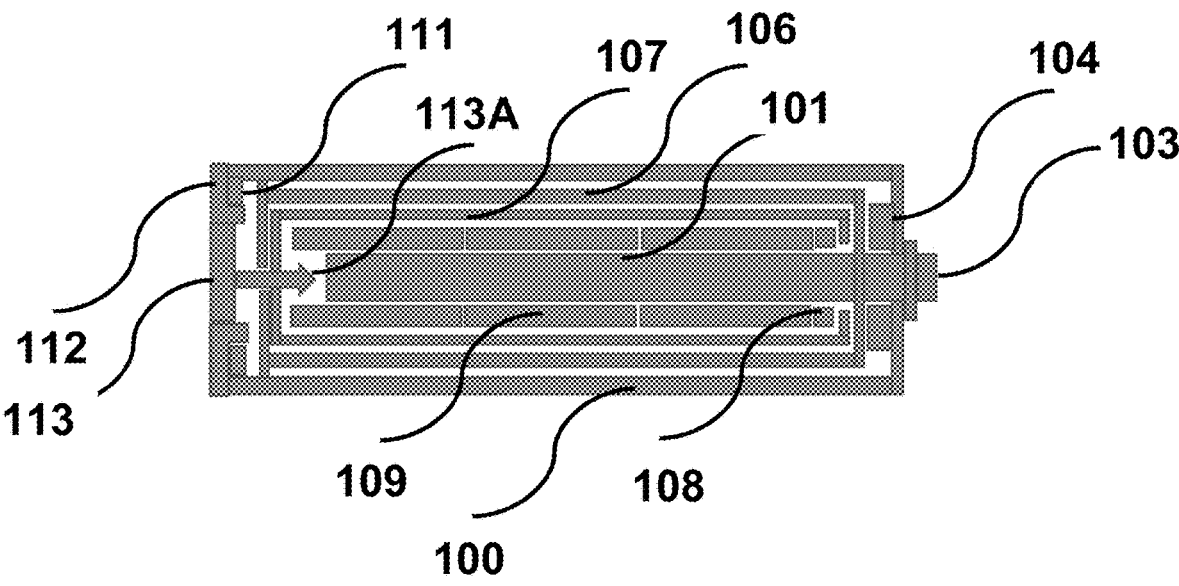
FIG. 15 shows a side cut-away view of a battery and the second end cap arranged in a closed position in relation to the opening in the casing, in accordance with an embodiment.
Figure 16:
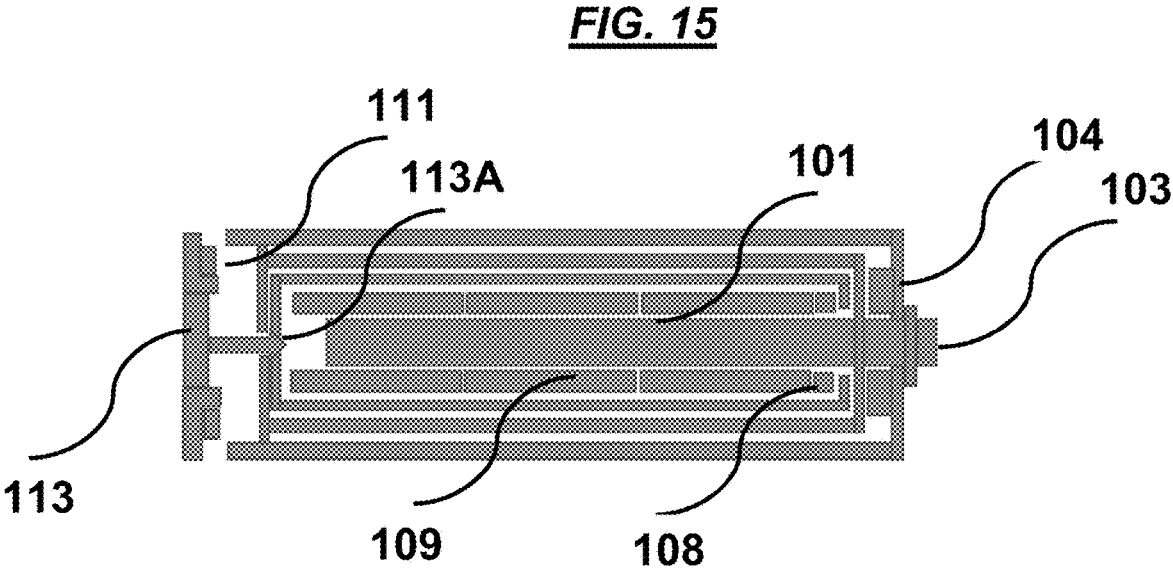
FIG. 16 shows a side cut-away view of a battery and the second end cap arranged in an opened position in relation to the opening in the casing. The second end cap cannot be entirely detached by virtue of the shape configuration of the conductive pin (1113A) which is engaged within the aperture of the securement portion (110)

Once the compressed powder rings (109) are nested within the casing (100), the permeable separator sheet (107) is folded inwardly over the electrolyte (109) as shown in FIG. 10 and a second end portion is bonded to the second end of the casing (100). A securement member (110) is configured for positioning within the casing (100) so as to secure the end of the permeable separator sheet (107) in its folder over position. The securement member (110) is co-moulded with one portion of a polymeric annular ring (114) that is bonded to the casing (100) adjacent the opening at the second end of the casing (100). Another portion of the polymeric annular ring (114) may include screw-threads which are configured for screw-threaded engagement with a corresponding threaded polymeric disk member (112). The threaded polymeric disk member (112) can be screwed into and out of engagement with the polymeric annular ring (114) so as to selectably seal and unseal the opening disposed in the second end of the casing (100). A metal conductive terminal (113) is disposed centrally of the threaded polymeric disk member (112) and has a conductive terminal pin (113A) extending from it inwardly of the casing (100) through the polymeric annular ring and through an aperture disposed in the securement member (110). In this embodiment, the tip of the conductive terminal pin (113A) is suitably shaped to allow it to be inserted through the aperture of the securement member (110) but to thereafter also be restricted from being retracted in a reverse direction out of the aperture of the securement member (110). In this way, a screw valve type assembly is conveniently formed at the second end of the casing (100) to selectably unseal the opening for ingress of water into the casing (100) or to selectably seal the opening to prevent the water from leaking out of the casing (100). As there are no detachable parts of the sealing arrangement in this embodiment as compared to embodiments where an entirely detachable end cap may be employed to seal or unseal the end of the casing (100), this alleviates risk of the end cap from being inadvertently misplaced. Of course, it is possible in certain embodiments for the sealing arrangement to include an entirely detachable end cap if so required.

As the metal conductive terminal (113) and the securement member (110) are both formed from conductive materials, they are both simultaneously in electrical communication with the conductive zinc lining (106) due to the biasing member (104) urging the zinc lining against the securement member (110).

In this embodiment, the steps in which the second end portion is connected to the end of the casing are as follows. The electrically-insulative polymeric annular ring (114) is first co-moulded with the conductive securement member (110) before the polymeric annular ring (114) is bonded to the casing, for instance using ultrasonic bonding. The corresponding threaded polymeric disk member (112) is co-moulded with an o-ring (111) and the conductive terminal/conductive pin (113/113A). The pin head (113A) of the conductive terminal pin is inserted into the aperture of the securement member (110) and either the shape of the pin head itself will prevent its withdrawal from the aperture, or, the pin head may be further manipulated after insertion (e.g. by TIG welding the tip of the pin, or bending the tip of the pin) to prevent its withdrawal from the aperture. The polymeric annular ring (114) may then be ultrasonically or adhesively bonded to the casing such that the entire second end portion assembly is secured to the end of the casing in a screw-valve arrangement which may be used to selectably seal and unseal the end of the casing.

Embodiments of the battery once assembled remain in an inactive state until there is ingress of water into the casing (100) via the unsealed second end of the casing. Water entering the casing (100) may flow along and through the permeable separator sheet (107) and into contact with the electrolyte powder rings (109). Once water has suitably contacted with the electrolyte (109) in the casing (100), the activated electrolyte (109) chemically reacts with the conductive lining (106) via the water-soaked permeable separator sheet (107) whereby a potential difference is generated within the battery between the conductive terminals (103, 113).

Advantageously, due to battery embodiments of the present invention being kept in an inactive state until use, such battery embodiments enjoy a shelf-life of considerably longer duration than conventional off-the-shelf type batteries intended for similar use. In contrast, conventional type batteries tend to deteriorate in performance much faster when in storage due to the electrolyte powder mixture being activated at the point of manufacture. Whilst embodiments described herein are particularly well-suited for and intended for use during emergency situations due to the longer shelf-life, the actual output performance of such battery embodiments may be comparable or superior to the power output expected of certain conventional batteries.

Also advantageously, the spacer element assists in providing venting of water within the battery casing and the resulting water circulation may improve battery performance by increased speed of exposure of the electrolyte to water within the casing.

Yet a further advantage of embodiments of the present invention may involve use of the biasing member (104) such as silicone pad which urges the zinc tube (106) in a direction which assists in it maintaining either direct or indirect electrical communication with the battery terminal pin (113A) and securement member (110).

A further advantage of embodiments of the present invention is that end portions of the casing (100) may be quickly and easily secured by ultrasonic welding which alleviates the unsightly nature of adhesive bonding as well as the uneven sealing provided by adhesive bonding.

A further advantage of the embodiments of the present invention is that as the wall thickness of the casing (100) may be made relatively thinner by using extruded polymeric material, this also allows for an increase in the amount of compressed powder that may be received within the casing (100) and this improves overall battery output performance. Furthermore, by utilising extruded polymeric material as the battery casing (100), a relatively thicker walled conductive lining (such as a zinc shell) may be relatively cheaply extruded and cut to size for use in the manufacture of batteries, and which may be easier and quicker to insert into the battery casing during manufacture of the batteries due to the thicker walled conductive lining (106) maintaining a straight configuration within the casing (100). In contrast with certain prior art approaches, a relatively thin and conductive lining may be used which tends to not keep a straight shape within the casing and thereby makes the manufacturing process of the prior art batteries more tedious.

Those skilled in the art will appreciate that embodiments described herein are susceptible to variations and modifications other than those specifically described. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to prior art in this specification is not an acknowledgment or any form of suggestion that that prior art forms part of the common general knowledge.

What is claimed:

1. A battery including:

a casing defining a first end and a second end and having an inner surface defining a chamber in which an electrolyte is disposed therein;

a conductive lining disposed within the chamber adjacent the inner surface of the casing, the conductive lining being configured for electrical communication with a first battery terminal at the second end of the casing;

a permeable separator sheet disposed between the electrolyte and the conductive lining;

a conductive rod having a first end configured for electrical communication with a second battery terminal, and, a second end configured for contacting with the electrolyte;

an opening disposed in the casing;

a sealing member configured for arrangement between at least a sealed position which restricts ingress of a liquid into the chamber via the opening, and, an unsealed position which allows ingress of a liquid into the chamber via the opening and into contact with the electrolyte so as to allow a potential difference to be produced between the first and second battery terminals;

at least one spacing element configured for spacing the electrolyte apart from the conductive lining within the chamber whereby the liquid is able to pass between the electrolyte and the conductive lining;

further including a silicone pad at the first end of the casing for urging the conductive lining and the first battery terminal into electrical communication with each other at the second end of the casing; and wherein the casing includes an electrically-insulative, polymeric material made of at least one of a copolymer, a mixed polymer blend, a thermoplastic material, a thermoset material, PE, PP, PVC, PVA, EVA, PEEL, PMMA, PTFE and any combination thereof.

2. The battery of claim 1 wherein the casing is extrusion molded or injection molded.

3. The battery of claim 1 wherein the electrolyte includes compressed electrolyte powder.

4. The battery of claim 1 wherein the conductive lining includes a zinc material.

5. A battery including:

a casing defining a first end and a second end and having an inner surface defining a chamber in which an electrolyte is disposed therein;

a conductive lining disposed within the chamber adjacent the inner surface of the casing, the conductive lining being configured for electrical communication with a first battery terminal at the second end of the casing;

a permeable separator sheet disposed between the electrolyte and the conductive lining;

a conductive rod having a first end configured for electrical communication with a second battery terminal, and, a second end configured for contact with the electrolyte;

an opening disposed in the casing;

a sealing member configured for arrangement between at least a sealed position which restricts ingress of a liquid into the chamber via the opening, and, an unsealed position which allows ingress of a liquid into the chamber via the opening and into contact with the electrolyte so as to cause a potential difference to be produced between the first and second battery terminals;

a biasing member with a silicone pad disposed at the first end of the casing and configured for urging the conductive lining and the first battery terminal into electrical communication with each other at the second end of the casing;

wherein the electrolyte is comprised of a metal oxide powder.

6. The battery of claim 5 including at least one spacing element configured for spacing the electrolyte apart from the conductive lining within the chamber whereby the liquid is able to pass between the electrolyte and the conductive lining.

7. The battery of claim 5 wherein the casing is extrusion molded or injection molded.

8. The battery of claim 5 wherein the electrolyte includes compressed electrolyte powder.

9. The battery of claim 5 wherein the conductive lining includes a zinc material.

10. The battery of claim 5 wherein the electrolyte is comprised of ammonium chloride particles, zinc chloride particles, manganese dioxide particles, acetylene carbon black particles and zinc oxide particles.

11. The battery of claim 10 wherein the electrolyte comprises, in ascending order of percentage weight of the electrolyte, zinc oxide particles, ammonium chloride particles, acetylene carbon black particles, zinc chloride particles, and manganese dioxide particles.

12. The battery of claim 5 further wherein the silicone pad is disposed on the inner surface of the casing.

13. The battery of claim 5 further wherein the silicone pad is disposed between the inner surface of the casing and the conductive lining.

14. The battery of claim 1 wherein the electrolyte is comprised of ammonium chloride particles, zinc chloride particles, manganese dioxide particles, acetylene carbon black particles and zinc oxide particles.

15. The battery of claim 14 wherein the electrolyte comprises, in ascending order of percentage weight of the electrolyte, zinc oxide particles, ammonium chloride particles, acetylene carbon black particles, zinc chloride particles, and manganese dioxide particles.

16. The battery of claim 1 further wherein the silicone pad is disposed between the inner surface of the casing and the conductive lining.

17. The battery of claim 1 further wherein the silicone pad is disposed on the inner surface of the casing.

* * * * *